(12) United States Patent
Pattullo

(10) Patent No.: US 7,104,252 B1
(45) Date of Patent: Sep. 12, 2006

(54) CRANKCASE VENTING ROTARY VALVE CARBURETOR

(75) Inventor: George M. Pattullo, Caro, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/153,151

(22) Filed: Jun. 15, 2005

(51) Int. Cl.
F02M 9/02 (2006.01)

(52) U.S. Cl. .................. 123/311; 261/44.8

(58) Field of Classification Search ........... 123/311, 123/196 R; 261/44.8, 44.3, 44.6
See application file for complete search history.

(56) References Cited

U.S. PATENT DOCUMENTS

| | | |
|---|---|---|
| 6,199,532 B1 | 3/2001 | Haberlein et al. |
| 6,394,425 B1 | 5/2002 | Nagata |
| 6,585,235 B1 | 7/2003 | Pattullo |
| 6,827,337 B1 | 12/2004 | Terakado |
| 6,877,474 B1 * | 4/2005 | Radel .................. 123/196 R |

2004/0182355 A1 9/2004 Kawamoto et al.

* cited by examiner

Primary Examiner—Willis R. Wolfe
Assistant Examiner—Hyder Ali
(74) Attorney, Agent, or Firm—Reising, Ethington, Barnes, Kisselle, P.C.

(57) ABSTRACT

A four-stroke combustion engine is lubricated by a mixture of lubricant, fuel and air received from a rotary valve type carburetor. A cylinder of the engine houses a reciprocating piston and together they generally define a combustion chamber segregated from a generally sealed cavity which contains a mechanism for operating intake and exhaust valves communicating with the combustion chamber. Generally non-burning lubricant along with fuel-and-air enters the combustion chamber from the rotary-type carburetor and blows-by the piston into the sealed cavity through a clearance defined generally between the cylinder and piston for cooling the engine and lubricating the mechanical linkage assembly. Preferably, the sealed cavity is vented directly into a rotary throttle valve of the carburetor for controlled flow back into the engine without use of a check valve, enhanced idling characteristics of the engine and substantially reduced spit-back through the carburetor air inlet.

26 Claims, 7 Drawing Sheets

CRANKCASE VENTING ROTARY VALVE CARBURETOR

FIELD OF THE INVENTION

This invention relates to a four-stroke combustion engine, and more particularly to a four-stroke combustion engine having a crankcase venting rotary valve type carburetor.

BACKGROUND OF THE INVENTION

Government agencies of an increasing number of countries are applying exhaust emission control regulations to protect the environment. These regulations are being applied to all combustion engines including portable engines used in common equipment such as chain saws, lawn mowers and hedge trimmers. One means of reducing exhaust emissions even in small portable engines is to utilize four-stroke engines instead of the more conventional two-stroke engines. In the larger prior art conventional four cycle engines, an atmospheric vented crankcase includes an oil reservoir and oil pump or oil splash system for lubrication of the crankshaft, piston rings, and overhead combustion chamber intake and exhaust valves. Because small versions of the well-known larger conventional four-stroke engines are typically expensive to manufacture, they are generally not practical for smaller capacity applications. Hence, various alterations of the prior art conventional four-cycle engines have been developed for smaller and less demanding applications. One such alteration is known as a fuel mixture-lubricated four-stroke engine described in U.S. Pat. No. 6,199,532, to Haberlein et al, issued Mar. 13, 2001 and incorporated herein by reference.

In this fuel mixture-lubricated four-stroke engine, the lubricant or oil is pre-mixed with the combustion liquid fuel prior to flowing through a carburetor in much the same way as a two-stroke engine. The intake manifold is in direct communication with the valve cover and crankcase which is part of a sealed system. During the typically downward intake or induction stroke of this scavenging four-stroke engine, the fuel-air-lubricant mixture flows into the combustion chamber from the crankcase, valve chamber and the carburetor. During the upward compression and exhaust strokes, the fuel-air-lubricant mixture flows into the valve chamber and crankcase from the carburetor.

The primary source of lubrication for the crankshaft, intake and exhaust valves and related components is supplied to the valve cover chamber and crankcase during the compression and exhaust strokes. During these strokes, fuel-air-lubricant mixture generally flows directly into the valve cover chamber and crankcase while bypassing the combustion chamber altogether. The piston rings and cylinder walls are also lubricated primarily from below by this source of lubricant. Although not the primary source of lubricant, some lubrication of the piston rings from above or within the combustion chamber occurs when the fuel-air-lubricant mixture enters the combustion chamber during the intake stroke.

Also, in such engines during the downward power stroke, when the intake and exhaust valves are closed, the crankcase is overpressurized and requires venting. Such venting in prior art four-stroke engines is typically achieved by routing a vent passage to either the inlet or outlet side of the carburetor through a check valve which is normally closed and opens when the crankcase is pressurized at a predetermined superatmospheric pressure. Unfortunately, such venting is expensive to manufacture and thus not practical for smaller engine applications. Moreover, should the check valve fail in its open position or generally lack the necessary responsive reaction, spit back through the carburetor and oil drippage through the air filter can result. Other alternatives include routing the vent passage to the intake manifold without a check valve. Unfortunately, this leads to engine stalls during cold idle operation and rough engine idling during normal temperatures.

SUMMARY OF THE INVENTION

A four-stroke combustion engine receives a mixture of lubricant, fuel and air from a rotary-valve type carburetor. Because the lubricant is pre-mixed with the incoming fuel, the engine preferably does not have a conventional oil pan or oil pump. A cylinder of the engine houses a reciprocating piston and together they generally define a combustion chamber. A generally sealed cavity located opposite the piston contains intake and exhaust valves of the combustion chamber and mechanical mechanism operably connected with the valves and the piston. During an induction stroke of the piston, the lubricant along with fuel-and-air enters the combustion chamber from the rotary-type carburetor. Collected lubricant in the combustion chamber generally does not burn with the fuel, and instead leaches or blows by into the cavity through a small clearance defined generally between the cylinder and piston. In this way, the lubricant reduces friction between the reciprocating piston and cylinder and is the primary source of lubricant for the mechanical mechanism.

Preferably, the cavity is vented directly into a rotary throttle valve assembly of the carburetor so that during the induction and power strokes of the piston, air and residual lubricant flow through a vent passage and controllably into the mixing passage of the carburetor via the rotary throttle valve assembly and preferably without a check valve. Because the rotary throttle valve also controls the flow of vented air and residual oil from the cavity, idling characteristics of the engine are enhanced. The valve assembly preferably has a rotary member seated rotatably in a valve chamber which traverses the mixing passage. The rotary member has a through-bore which adjustably aligns to the mixing passage for controlling the quantity of lubricant, fuel and air flowing into the engine. When the rotary member is in an idle position, it forms an adjustable downstream idle opening with the carburetor body at a downstream end of the through-bore for flow into the mixing passage. Similarly, the rotary member when in the idle position forms an upstream idle opening at an upstream end of the through-bore, and which is diametrically opposite the downstream idle opening. The vent passage communicates directly with the through-bore between the downstream and upstream idle openings.

Objects, features and advantages of this invention include an economical four-stroke combustion engine which does not require an oil reservoir, oil pump or crankcase vent passage check valve. Moreover, the present invention provides a smoother running engine which is less likely to stall during cold idle conditions, reduces emissions for small engine applications, is relatively simple in design, is robust, and has a long, useful and maintenance-free life.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENTS

Figure 1:
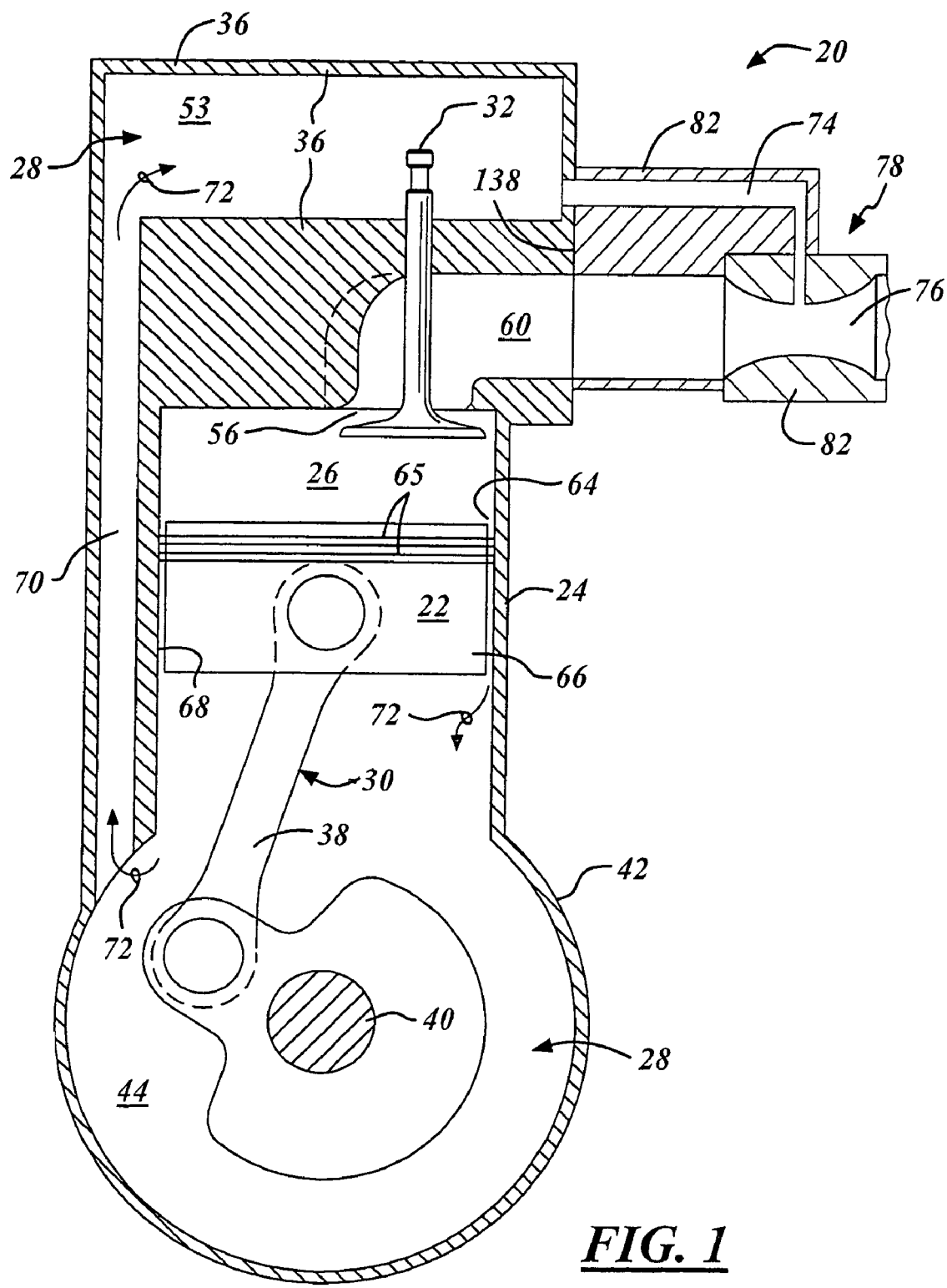
FIG. 1 is a schematic sectional view of a four-stroke combustion engine with a carburetor of the present invention.
Figure 2:
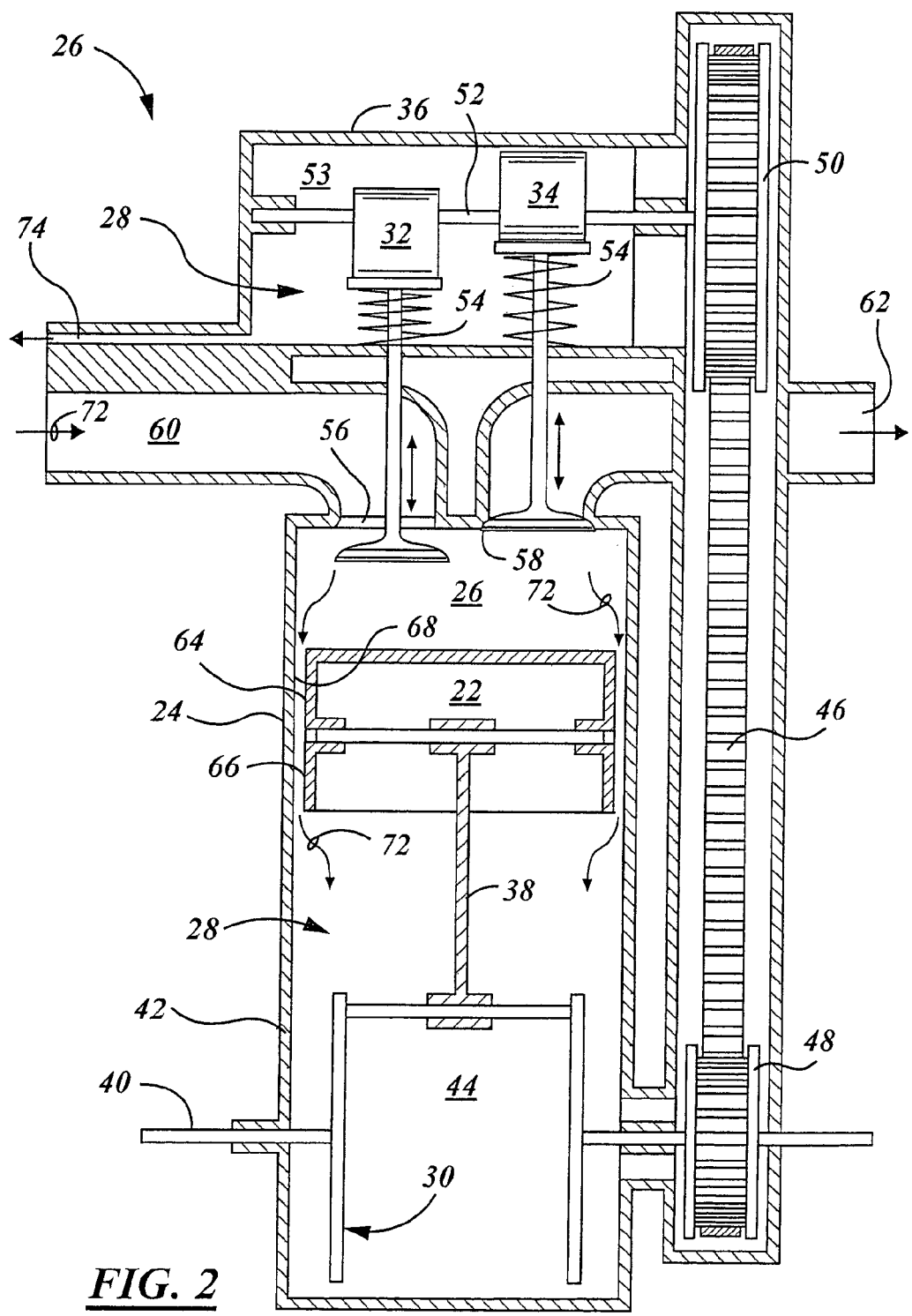
FIG. 2 is another schematic sectional view of the four-stroke combustion engine.
Figure 3:
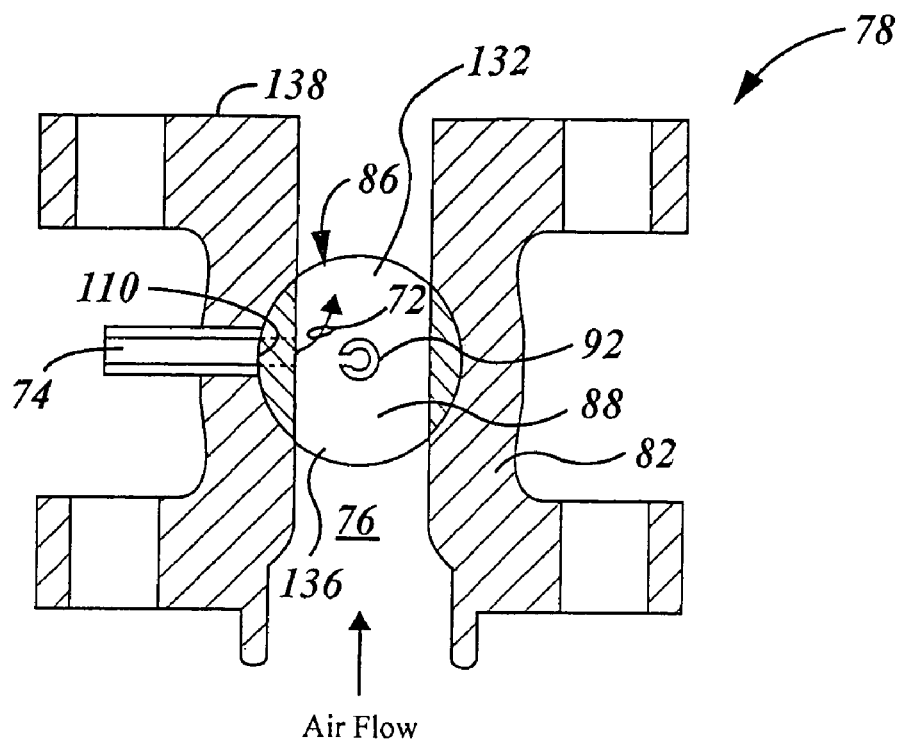
FIG. 3 is a schematic sectional view of a rotary valve type carburetor of the four-stroke combustion engine show in a wide open throttle position.

Referring in more detail to the drawings, FIGS. 1–2 illustrate a four-stroke combustion engine 20 with a carburetor 78 of the present invention. The engine 20 has a reciprocating piston 22 slidably received in a cylinder 24 and delimiting a combustion chamber 26. Generally isolated from the combustion chamber 26 by the piston 22 is a substantially sealed cavity 28 generally defined by a cylinder head 36 and crankcase 42. The cavity 28 contains a mechanical linkage assembly 30 that transfers power of the engine 20 and operably connects the reciprocating piston 22 with overhead intake and exhaust valves 32, 34 which cooperate with the combustion chamber and mount operably to the valve housing or cylinder head 36.

Preferably, the linkage assembly 30 has a piston rod 38 pivotally connected with the piston 22 and a rotary crankshaft 40 which is journaled for rotation in the crankcase 42 which generally defines a lower portion 44 of the sealed cavity 28. The crankcase is engaged and communicates with the cylinder 24. Preferably, a cogged timing belt 46 is looped about a cogged crankshaft pulley 48 fixed to the crankshaft 40 and a cogged cam pulley 50 fixed to an overhead, lobed, camshaft 52 of the mechanical linkage assembly 30 journaled for rotation in the valve head 36 and which sequentially operates the intake and exhaust valves 32, 34. Generally, the valves 32, 34 and lobed camshaft 52 are in an upper portion or valve chamber 53 of the sealed cavity 28 defined at least in part by the valve housing 36. As is generally known by one skilled in the art of four-stroke engines, the mechanical linkage assembly 30 and operation of the intake and exhaust valves 32, 34 is not limited to that described above. For instance, but not limited to, the cogged belt 46, pulleys 48, 50 and overhead cam shaft 52 can be replaced with any combination of pivoting valve levers and push rods which ride upon non-concentric lobes of a camshaft journaled for rotation in the crankcase 42 and engaged operably to the crankshaft via a chain or gears (not shown).

As is generally known in the art for four-stroke engines, communicating with the combustion chamber 26 and carried generally by the valve head 36 is an intake port 56 and an exhaust port 58 associated with respective intake and exhaust valves 32, 34. Each valve 32, 34 is generally biased in a closed direction sealing off the respective ports 56, 58 by compression springs 54 which also prevent valve chatter or noise during engine operation. When the intake valve 32 is open, the combustion chamber communicates with an intake channel 60 of the valve head 36 via the intake port 56, and when the exhaust valve 34 is open the combustion chamber communicates with an exhaust channel 62 of the valve head 36 via the exhaust port 58.

Opening and closing of the valves 32, 34 is generally dictated by which of four distinctive strokes the piston 22 is moving through. The strokes of the piston 22 are generally known as intake, compression, power, and exhaust. During the intake stroke (see FIGS. 1 and 2), the intake valve 32 is generally open and the exhaust valve 34 is closed as the piston 22 moves downward. The increasing volume of the combustion chamber 26 induces a mixture of lubricant-fuel-and-air to flow through the intake channel 60 and into the combustion chamber 26. The intake stroke is followed by a compression stroke where the intake and exhaust valves 32, 34 are generally closed and the piston 22 moves upward compressing the lubricant-fuel-and-air mixture in the combustion chamber 26. Near a top-dead-center of the piston 22 (i.e. full compression) the mixture is ignited preferably by a spark plug (not shown) sending the piston 22 downward, known as the power stroke, and driving the crankshaft 40. Following the power stroke is the exhaust stroke where the intake valve 32 is closed and the exhaust valve 34 is open as the piston 22 moves upward and pushes the burnt gasses, but generally not the lubricant, out of the combustion chamber 26 and through the exhaust channel 62 via the exhaust port 58.

Unlike conventional four-stroke combustion engines, the crankcase 42 of the combustion engine 20 does not generally have a lubricant reservoir or a conventional oil pan and preferably does not have an oil pump or an oil splash system for lubrication and cooling of moving components such as the mechanical linkage assembly 30. Instead, the lubricant is pre-mixed with the fuel-and-air mixture and generally enters the engine 20 through the intake channel 60, the combustion chamber 26 and into the cavity 28 preferably solely by blow-by of the piston rings 65. The lack of a lubricant reservoir and oil pump is particularly advantageous for smaller capacity more economical four-stroke engines having less expensive manufacturing techniques which do not lend themselves to high tolerances. That is, for more expensive, high tolerance, manufactured engines having a lubricant reservoir and oil pump, it is ideal to have a tight tolerance between the piston and cylinder thus achieving maximum compression of the fuel-and-air mixture, maximum power production during the power stroke, and typically higher fuel efficiency. Because of the closer or smaller tolerances between the typical cylinder and piston of larger four-stroke engines, little to no lubricant transfers between the combustion chamber and the crankcase except that necessary to lubricate the cylinder wall and a series of piston rings.

Generally, the less expensive four-stroke engine 20 of the present invention has a small annular clearance or piston ring end gap 64 defined between an outer cylindrical face 66 of the piston 22 and an inner cylindrical wall 68 of the cylinder 24. Empirical data has demonstrated that the annular clearance or piston ring end gap 64 can be large enough to transfer, leach or blow-by un-burnt lubricant out of the combustion chamber 26 and into the lower portion 44 of the sealed cavity 28, and yet small enough to maintain a substantial degree of compression during the compression stroke. This relatively small amount of lubricant which is not prone to combustion is sufficient to lubricate and cool the mechanical linkage assembly 30 and the reciprocating piston 22 and piston rings 65. Collection of lubricant in and about the annular clearance 64 also promotes some friction-free sealing between the cylinder wall 68 and the face 66 of the piston 22. Preferably, the intake channel or manifold 60 does not communicate directly with the cavity 28 other than through the combustion chamber 26 and annular clearance 64. Alternatively, the annular clearance 64 can be replaced with, or assisted by, an oil scraping type of piston ring 65 as described in United States Patent Application Publication US 2004/0182355 A1, filed Mar. 18, 2003 and incorporated herein in its entirety.

The reciprocating motion of the piston 22 is generally used to move or pump the blow-byed lubricant as a mist about the sealed cavity 28. A conduit 70 of the sealed cavity 28 generally communicates the lower portion 44 with the upper portion 53 of the sealed cavity 28 and provides a flow path as indicated by the arrows identified as 72 for movement of the lubricating mist from the lower portion 44 of the cavity 28 and into the upper portion 53 of the cavity 28 for lubrication of the intake and exhaust valves 32, 34. During the induction stroke with the intake valve 32 open, the volume of the lower portion 44 becomes smaller and the lubricating mist is induced to flow into the upper portion 53 via the conduit 70 and at least partially through a vent passage 74 communicating controllably with a fuel-and-air mixing passage 76 of a rotary-type carburetor 78 of the engine 20.

During the compression stroke, lubricant which entered the combustion chamber 26 during the induction stroke substantially blow-bys into the lower portion 44 of the sealed cavity 28. During the power stroke, both the intake and exhaust valves 32, 34 are closed and the sealed cavity 28 is slightly over-pressurized with some lubricating mist flowing into the carburetor 78 through the vent passage 74. Spit-back of air and lubricant through the carburetor 78 is generally prevented based on location of the vent passage 74 relative to a rotary-type throttle valve assembly 80 of the carburetor 78 and an inherent back pressure characteristic of the rotary-type throttle valve assembly. During the exhaust stroke, the intake valve 32 is closed and the sealed cavity 28 becomes slightly under-pressurized with the upward movement of the piston 22 causing some lubricant-fuel-and-air to reverse flow from the carburetor 78, through the vent passage 74 and into the sealed cavity 28 for later scavenging of the fuel (similar to two-stroke engine applications).

Referring to FIGS. 3–11, more specific to the rotary-type carburetor 78 of the four-stroke combustion engine 20, the vent passage 74 is defined at least in part by a carburetor body 82 which also defines the mixing passage 76 extending there-through and communicating with the intake channel 60. A valve chamber or generally blind bore 84 in the body 82 traverses the mixing passage 76 for rotatable receipt of a substantially cylindrical rotary valve member 86 of the rotary throttle valve assembly 80. The rotary member 86 has a through-bore 88 which selectively and progressively aligns with the lubricant-fuel-and-air mixing passage 76 as the rotary member 86 controllably rotates and is cam-raised by the assembly 80 to move it between idle and wide open positions to thereby control the flow of air, fuel and lubricant through the carburetor 78. One embodiment of a cam structure which can controllably raise and rotate the rotary member 86 is described in U.S. Pat. No. 6,585,235, to Pattullo, issued Jul. 1, 2003, and incorporated herein by reference in its entirety.

Figure 4:
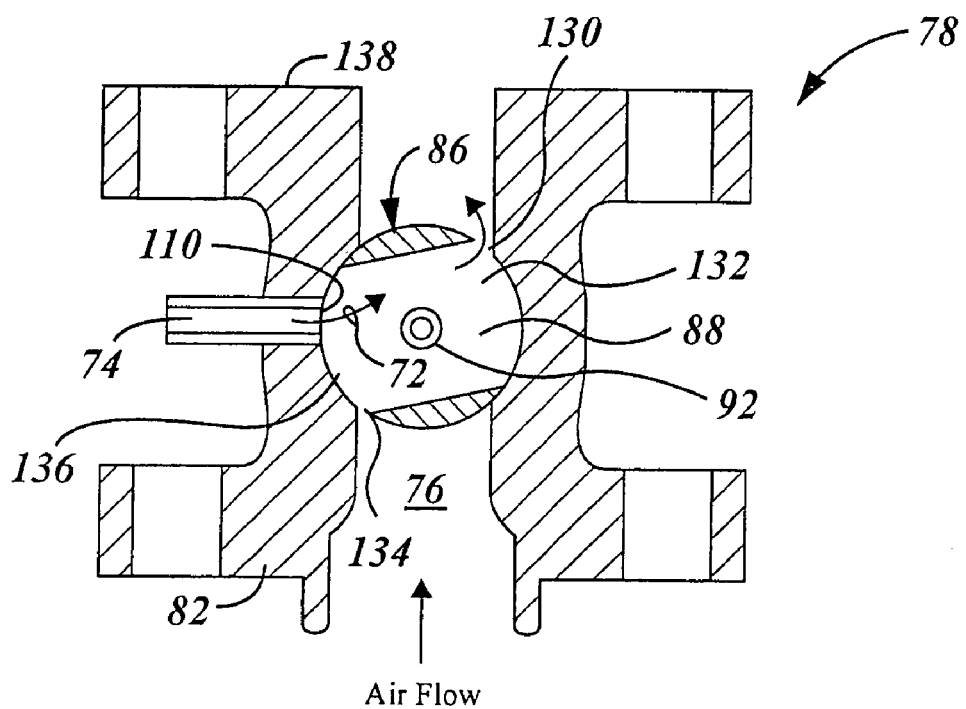
FIG. 4 is a schematic sectional view of the rotary valve type carburetor similar to FIG. 3 except shown in a low speed position.
Figure 5:
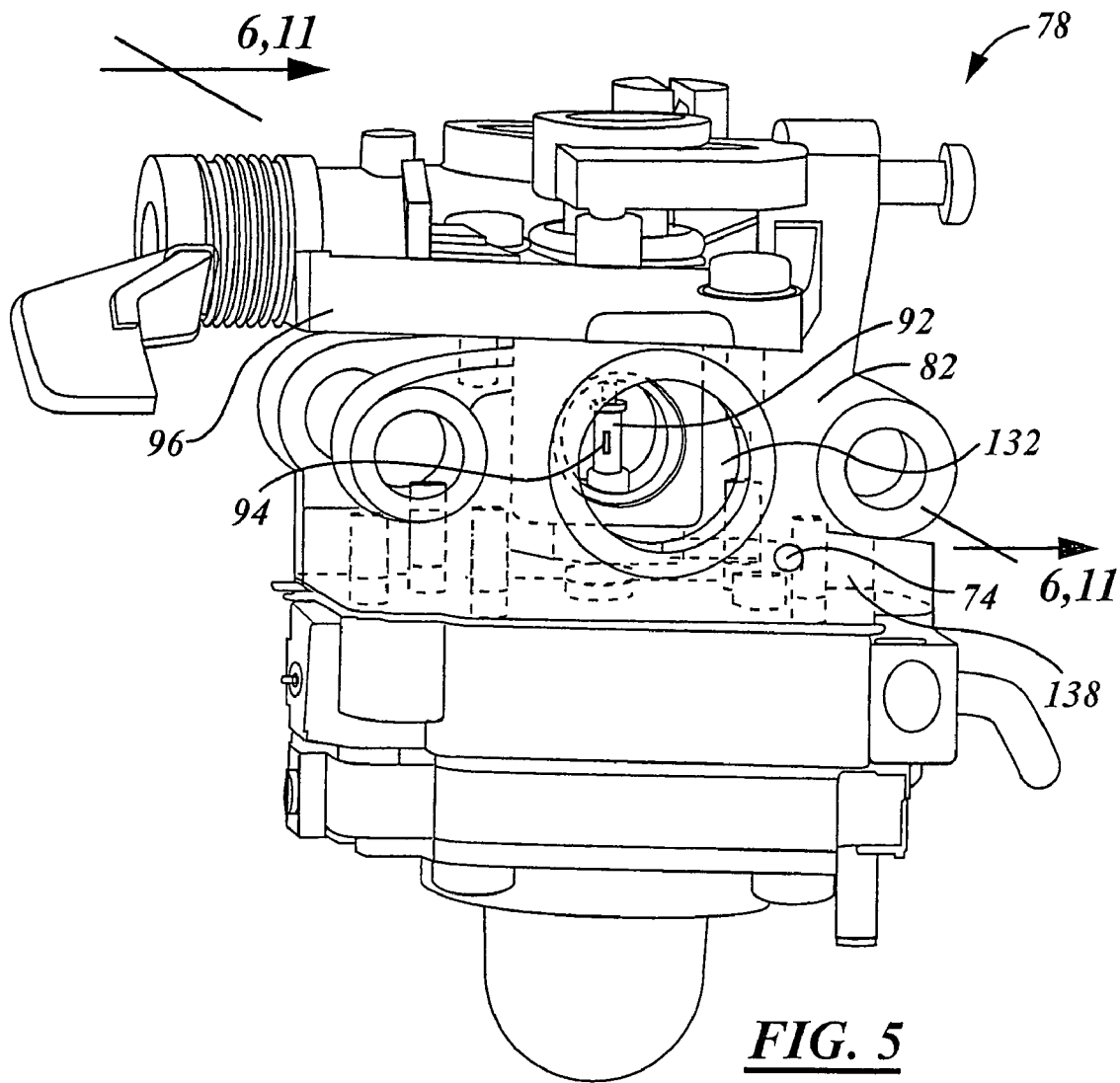
FIG. 5 is a perspective end view of the rotary valve type carburetor.
Figure 7:
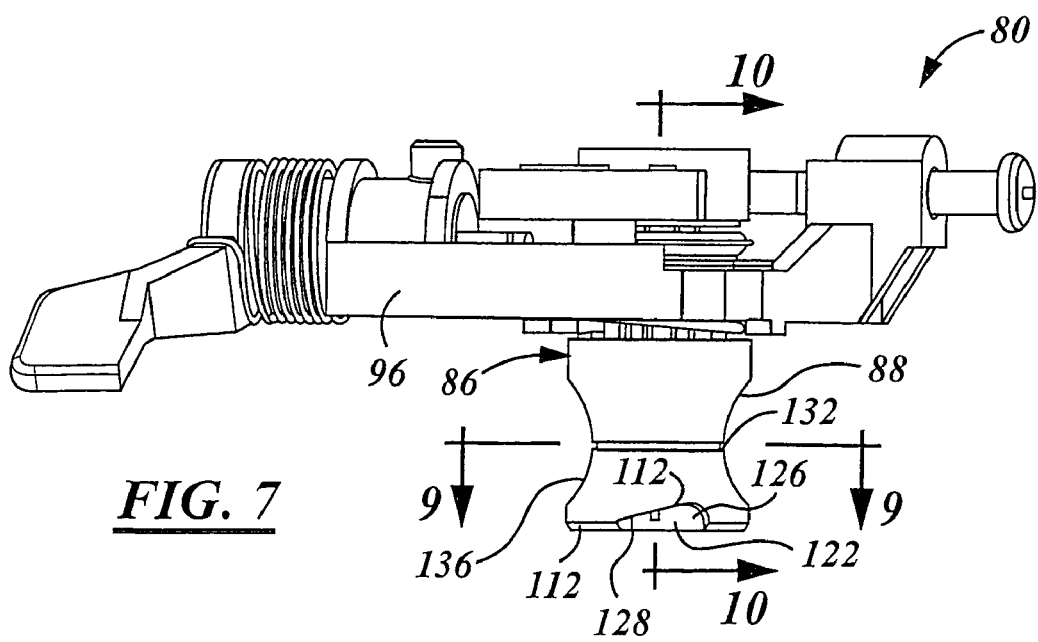
FIG. 7 is a side view of a rotary valve assembly at the carburetor.
Figure 6:
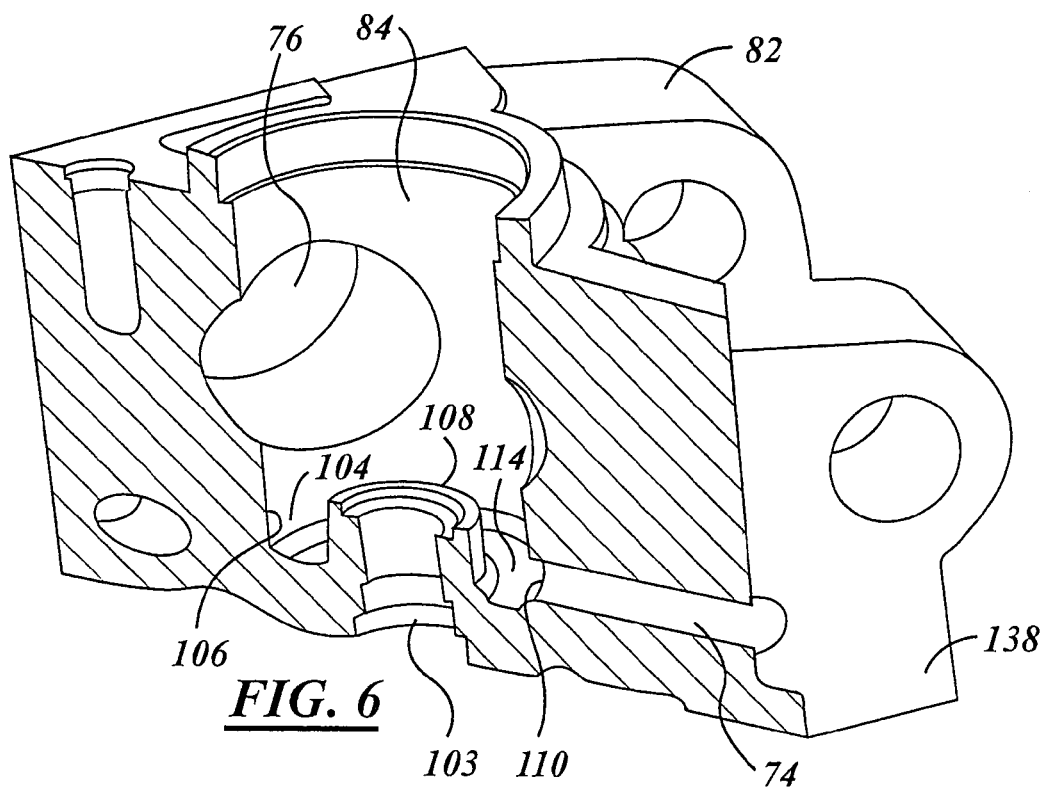
FIG. 6 is a sectioned perspective view of a carburetor body of the rotary valve type carburetor taken along line 6—6 of FIG. 5.
Figure 8:
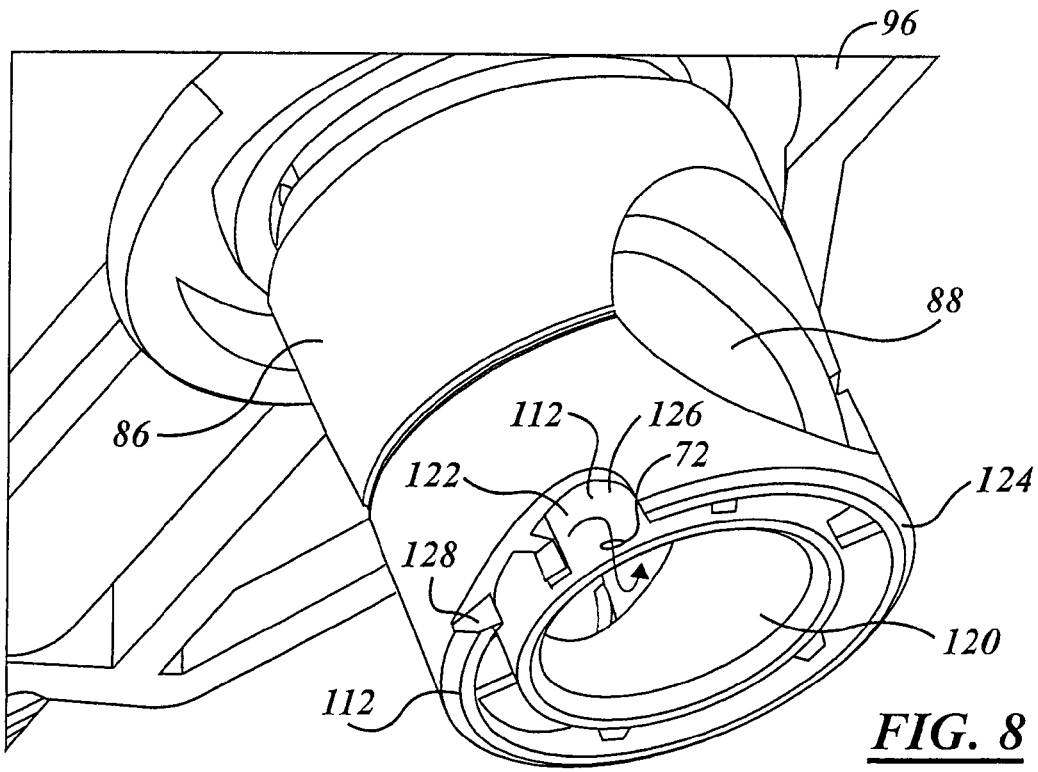
FIG. 8 is a perspective bottom view of a rotary member of the rotary valve assembly.
Figure 9:
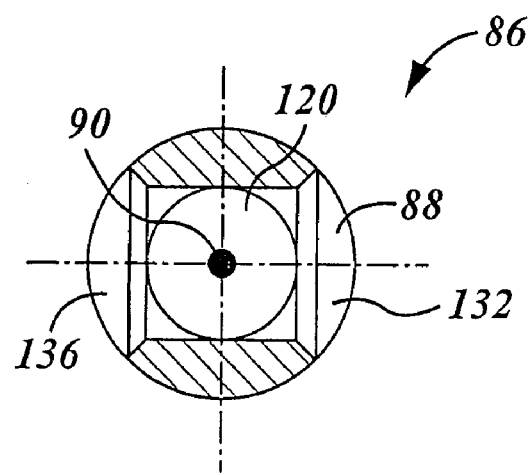
FIG. 9 is a cross section of the rotary member taken along line 9—9 of FIG. 7.
Figure 10:
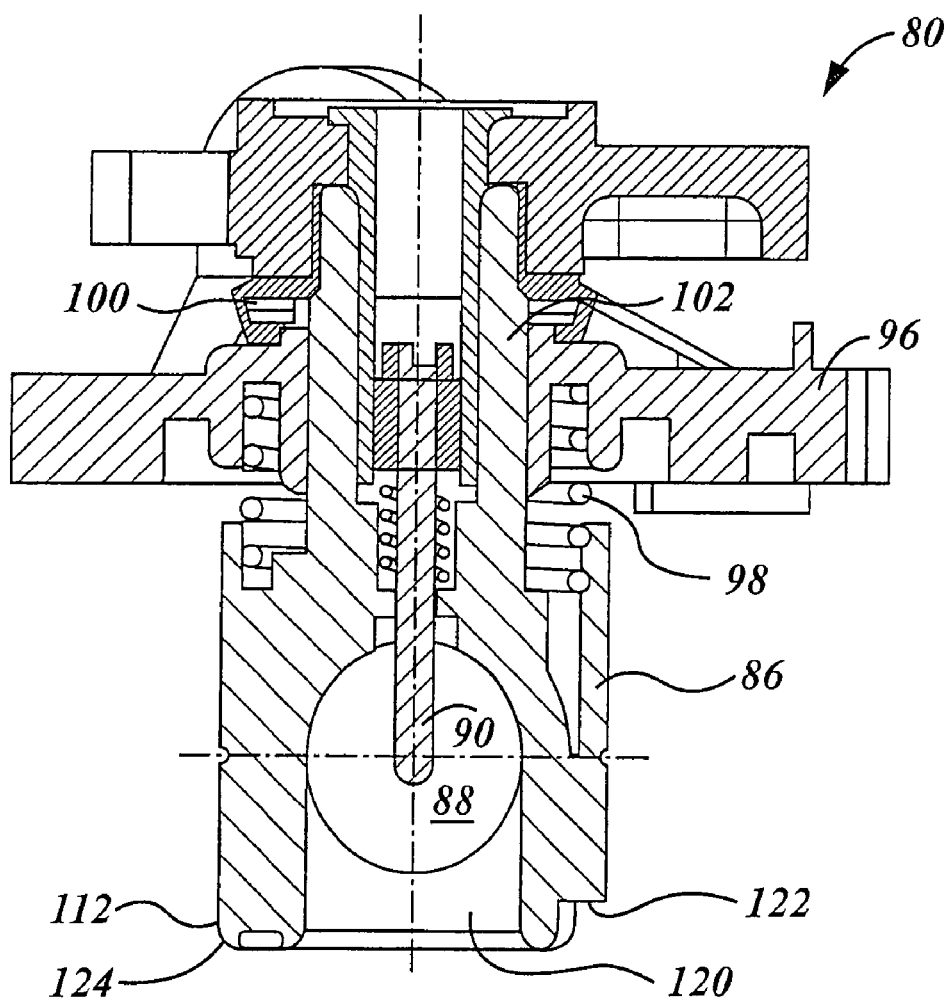
FIG. 10 is a cross section of the rotary valve assembly taken along line 10—10 of FIG. 7.
Figure 11:
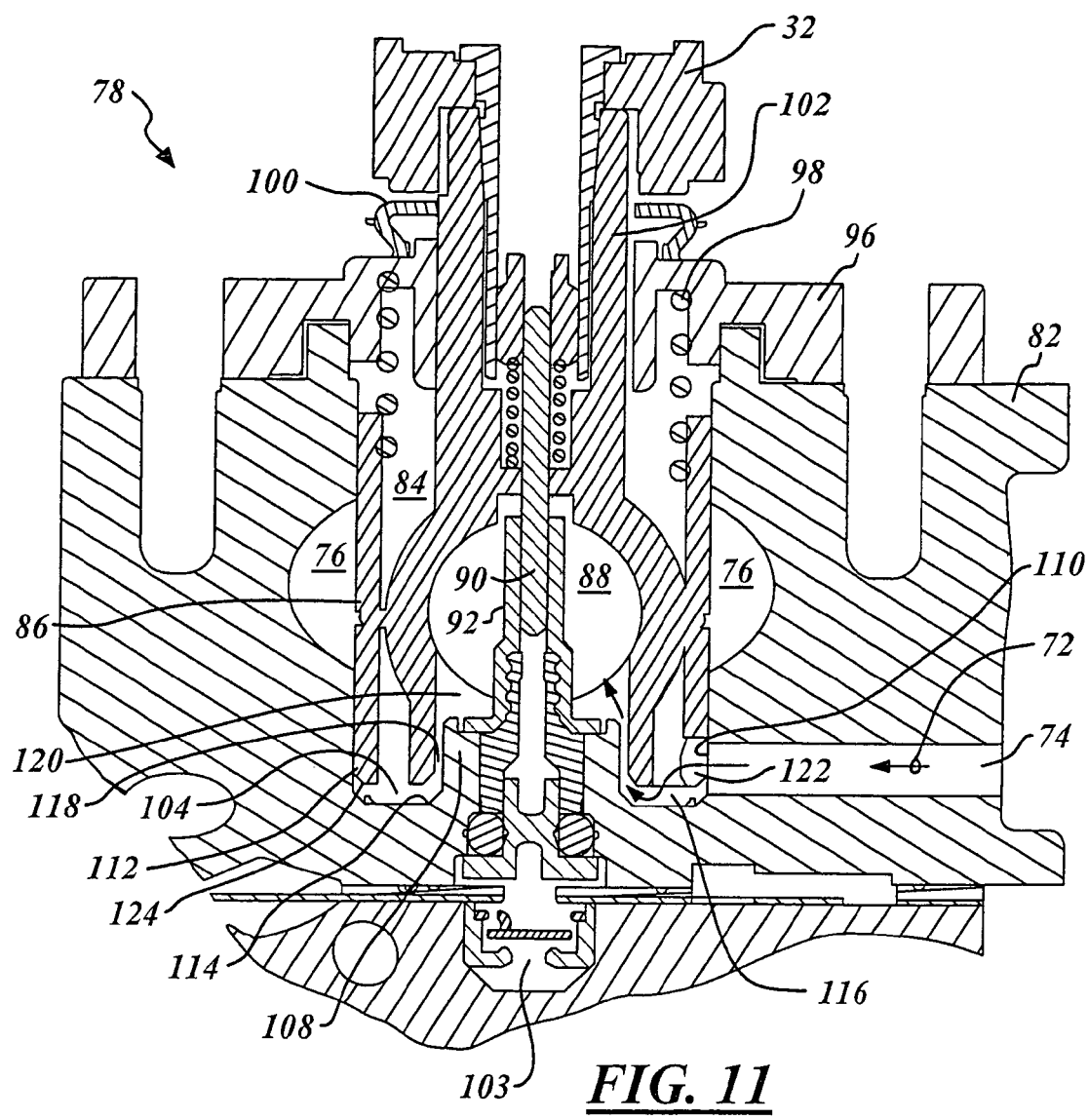
FIG. 11 is partial cross section of the rotary valve type carburetor taken along line 11—11 of FIG. 5.

The axial movement of the rotary member 86, as the member is rotated, axially moves a fuel mixture needle 90 carried by the member 86 within and relative to a tubular fuel jet 92 carried by the carburetor body 82 to thereby vary the flow cross-section of a side orifice 94 of the fuel jet 92 to control, at least in part, the amount of liquid fuel and lubricant discharged from the orifice 94. A throttle valve plate 96 traps a coiled spring 98 generally against the top of the rotary member 86 to provide a force biasing the rotary member 86 axially downward in its valve chamber 84 and into the idle position (as best shown in FIGS. 4 and 11). An annular flexible seal 100 is disposed around an upper segment 102 of the rotary member 86 to provide a liquid tight seal between the rotary member and throttle valve plate 96. From a lubricant and fuel metering chamber (not shown), the lubricant and fuel flows to the fuel jet 92 through a fuel passage 103 of the body 82 and into the mixing passage 76 in response to a differential pressure across the fuel jet, in a known manner. Although not limited to, one preferred example of a fuel metering assembly is disclosed in U.S. Pat. No. 5,711,901 which is incorporated herein by reference in its entirety.

At the bottom of the valve chamber 84 is an annular or continuous groove 104 which opens upward and is defined radially between a substantially cylindrical surface 106 of the chamber 84 disposed generally below the mixing passage 76 and an upward projecting annular prominence or shoulder 108 of the body 82 disposed generally in the valve chamber 84 and concentrically about the fuel passage 103 and needle 90. A vent aperture 110 of the vent passage 74 is carried or defined by the cylindrical surface 106 of the body 82 and opens into the annular groove 104. A downward projecting annular collar 112 of the rotary member 86 rotatably fits into the annular groove 104 and is spaced from an annular bottom 114, which defines in-part the groove 104, by a varying annular gap portion 116 having a minimum distance when the rotary member 86 is in the idle position (see FIG. 11) and by a maximum distance when the rotary member 86 is in the wide open position. Communicating with the annular gap portion 116 of the annular groove 104 is a continuous radial gap portion 118 of the annular groove 104 disposed radially between the prominence 108 of the body 82 and the collar 112.

The radial gap portion 118 communicates with the through-bore 88 of the rotary member 86 through a hole 120 generally defined circumferentially by the collar 112. Because the rotary member 86 moves axially when rotated, a tapered notch 122 is defined by an outer wall 124 of the collar 112 generally at the vent aperture 110 location providing a continuous free flowing vent path to the through-bore 88 which generally does not alter in flow cross section when the rotary member 86 is rotated and lifts partially out of the annular groove 104. When the rotary member 86 is in the idle position and thus closest to the bottom 114 of the annular groove, a large end 126 of the tapered notch 122 is circumferentially and axially aligned to the vent aperture 110, and when the rotary member 86 is in the wide open position and thus furthest from the bottom 114, a small end 128 of the tapered notch 122 is aligned to the vent aperture 110. In this way, a continuous flow path for venting of the sealed cavity 28 is provided first through the vent passage 74, then the vent aperture 110, the tapered notch 122, the varying annular gap portion 116, the radial gap portion 118, the hole 120, the through-bore 88, and then into the mixing passage 76 through an adjustable downstream opening 130 generally formed between the body 82 at the mixing passage 76 and the rotary member 86 at a downstream end 132 of the through-bore 88.

As previously discussed, a back pressure exists generally within the mixing passage 76 which prevents spit back of lubricant and air through the carburetor 78 when the piston 22 is traveling in its power stroke and generally when the engine 22 is running at lower speeds. This back pressure is created at least in part by the tapered notch 122 and a second adjustable upstream opening 134 opposed diametrically to the downstream opening 130 with respect to the rotary member 86 and generally formed between the body 82 at the mixing passage 76 and the rotary member 86 at an upstream end 136 of the through-bore 88. The vent passage 74 utilizes this back pressure by communicating with the mixing passage 76 between the two diametrically opposed openings 130, 134 and not upstream or downstream of both openings.

With the vent passage 74 integrated in this way through the rotary throttle valve assembly 80, the vent passage 74 does not require a conventional check valve, or positive crankcase valve, when venting the sealed cavity 28. Because the vent passage 74 does not communicate directly upstream of the throttle valve assembly 80 and instead communicates in the more controlled environment of the mixing passage, drooling or dripping of oil through an air filter, air leaks, and other undesirable effects caused possibly due to an otherwise required, malfunctioning, check valve are minimized or eliminated. Moreover, because the vent passage 74 does not communicate with the mixing passage 76 directly downstream of the throttle valve assembly 80, or directly into the intake channel 60, and without a check valve, the idle performance characteristics of the engine 20 are not significantly degraded. Specifically, because the vent passage 74 is integrated into the rotary throttle valve assembly 80 (i.e. between diametrically opposed idle control openings 130, 134) and not the intake channel 60, the opening(s) through the mixing passage 76 of the rotary member 86 is significantly larger at engine idle producing greater idle stability and an economical four-stroke engine which is less likely to stall at initial warm-up conditions and is more stable at normal temperature operation.

Preferably, a mounting face 138 of the carburetor body 82 is sealed and engaged to the valve head or housing 36. The vent passage 74 preferably of the body 82 and the mixing passage 76 both extend through the mounting face 138 to respectively communicate with the upper portion 53 of the sealed cavity 28 through the valve housing 76, and to communicate with the intake channel 60.

While the forms of the invention herein disclosed constitute presently preferred embodiments, many others are possible. For instance, the vent passage 74 can be formed by hose(s) and fittings communicating directly between the lower portion 44, or upper portion 53, of the sealed cavity 28 and the carburetor 78. Yet further, the four-stroke engine 20 can conceivably have multiple cylinders and pistons 22 sharing a common sealed cavity. It is not intended herein to mention all the possible equivalent forms or ramifications of the invention. It is understood that the terms used herein are merely descriptive, rather than limiting, and that various changes may be made without departing form the spirit or scope of the invention.

The invention claimed is:

1. An oil-in-fuel lubricated four-stroke combustion engine having at least one reciprocating piston disposed in a cylinder and defining in part a combustion chamber, an intake port of the cylinder communicating intermittently by an intake valve and between the combustion chamber and an intake channel, an exhaust port of the cylinder communicating intermittently by an exhaust valve and between the combustion chamber and an exhaust channel, and a mechanical mechanism operably connecting the intake and exhaust valves with the piston and disposed in a generally sealed cavity, the four-stroke combustion engine comprising:
  a rotary-type carburetor having a mixing passage extending through a carburetor body and communicating with the intake channel, a cylindrical valve chamber intersecting the mixing passage, a rotary throttle member disposed rotatable in the cylindrical valve chamber, a bore extending through the rotary throttle member with generally opposed ends constructed and arranged to adjustably continuously communicate with and rotate generally into alignment with the mixing passage; and
  a vent passage of the carburetor extending between the sealed cavity and the rotary throttle member for continuous communication of the sealed cavity with the mixing passage by opening directly into the bore through the rotary throttle member between the ends of the bore.

2. The four-stroke combustion engine set forth in claim 1 further comprising:
  a valve housing engaged to the cylinder;
  an upper portion of the sealed cavity defined in part by the valve housing; and
  the intake and exhaust valves being mounted movably in the upper portion and wherein the upper portion does not communicate directly with the intake channel.

3. The four-stroke combustion engine set forth in claim 1 further comprising:
  an internal surface of the cylinder;
  an outer face of the piston; and
  an annular clearance defined between the internal surface and the outer face for leaching of lubricant from the combustion chamber and into the sealed cavity in response to an under pressure of the sealed cavity.

4. The four-stroke combustion engine set forth in claim 2 further comprising:
  an internal surface of the cylinder;
  an outer face of the piston; and
  a clearance defined between the internal surface and the outer face for leaching of lubricant from the combustion chamber and into the sealed cavity.

5. An oil-in-fuel lubricated four-stroke combustion engine having at least one reciprocating piston disposed in a cylinder and defining in part a combustion chamber, an intake port of the cylinder communicating intermittently by an intake valve and between the combustion chamber and an intake channel, an exhaust port of the cylinder communicating intermittently by an exhaust valve and between the combustion chamber and an exhaust channel, and a mechanical mechanism operably connecting the intake and exhaust valves with the piston and disposed in a generally sealed cavity, the four-stroke combustion engine comprising:
  a rotary-type carburetor having a body, a mounting face of the carburetor body, a mixing passage extending through the carburetor body and communicating with the intake channel, a cylindrical valve chamber intersecting the mixing passage, a rotary throttle member disposed rotatably in the cylindrical valve chamber, a bore extending through the rotary throttle member and constructed and arranged to adjustably communicate with and rotate into generally axial alignment with the mixing passage;

a vent passage of the carburetor extending between the sealed cavity and the cylindrical valve chamber for flow from the cavity and directly into the bore in response to an overpressure of the sealed cavity;

an upper portion of the sealed cavity defined in part by a valve housing with the intake and exhaust valves at least in part in the valve housing, the upper portion of the sealed cavity does not communicate directly with the intake channel; and the vent passage extends through the mounting face to communicate directly with the upper portion of the sealed cavity through the valve housing, and the mixing passage extends through the mounting face to communicate directly with the intake channel.

6. The four-stroke combustion engine set forth in claim 5 further comprising:
a crankcase engaged to the cylinder; and
a lower portion of the cavity defined at least in part by the crankcase and communicating with the upper portion by at least one conduit for housing at least a portion of the mechanical mechanism, and communicating with the combustion chamber through a clearance between the piston and the cylinder.

7. The four-stroke combustion engine set forth in claim 6 wherein the vent passage communicates directly with the lower portion of the cavity through the crankcase.

8. A rotary-type carburetor for a four-stroke combustion engine having a cylinder, a piston slidably received in the cylinder, a combustion chamber defined at least in part by the piston and cylinder, an intake valve communicating with the combustion chamber, an exhaust valve communicating with the combustion chamber, a mechanical mechanism operably connecting the piston and the intake and exhaust valves and a generally sealed cavity housing the mechanical mechanism which operably connects the piston and the intake and exhaust valves, the rotary-type carburetor comprising:
a carburetor body;
an elongated mixing passage extending through the body;
a valve chamber communicating with and transverse to the mixing passage and defined at least in part by the carburetor body;
a rotary member fitted rotatably into the valve chamber;
a through-bore extending through the rotary member from an upstream end to a downstream end of the through-bore, and constructed and arranged to adjustably align to the mixing passage;
a hole of the rotary member continuously communicating between the valve chamber and the through-bore at a location between the upstream and downstream ends of the through-bore; and
a vent passage for continuously communicating between the sealed cavity of the combustion engine and the valve chamber of the carburetor to provide continuous communication between the sealed cavity and the mixing passage through the through-bore of the rotary member.

9. The rotary-type carburetor set forth in claim 8 further comprising:
a mounting face of the carburetor body engaged to a cylinder head of the four-stroke engine;
the mixing passage communicating through the mounting face for direct communication with an intake channel of the cylinder head; and
the venting passage communicating through the mounting face for direct communication with the sealed cavity.

10. A rotary-type carburetor for a four-stroke combustion engine having a generally sealed cavity housing a mechanical mechanism which operably connects intake and exhaust valves with a reciprocating piston housed slidably by a cylinder defining in part a combustion chamber, the rotary-type carburetor comprising:
a carburetor body;
an elongated mixing passage extending through the body;
a valve chamber communicating with and transverse to the mixing passage and defined at least in part by the carburetor body;
a rotary member fitted rotatable into the valve chamber;
a through-bore extending through the rotary member from an upstream end to a downstream end of the through-bore, and constructed and arranged to adjustably generally align with the mixing passage;
a hole of the rotary member communicating between the valve chamber and the through-bore between the upstream and downstream ends of the through-bore;
a vent passage communicating between the sealed cavity of the combustion engine and the valve chamber of the carburetor; and
the vent passage does not have a check valve.

11. The rotary-type carburetor set forth in claim 10 further comprising:
an annular groove of the valve chamber communicating directly with the vent passage;
a bottom of the valve chamber carried by the body and defining in part the annular groove;
a cylindrical prominence of the body projecting upward from the bottom and defining in part the annular groove; and
a collar of the rotary member projecting into the annular groove, spaced axially from the bottom, and spaced radially outward from the prominence.

12. The rotary-type carburetor set forth in claim 11 further comprising:
a cylindrical surface carried by the body, opposed to the cylindrical prominence and defining in part the annular groove; and
a vent aperture of the vent passage defined by the cylindrical surface.

13. The rotary-type carburetor set forth in claim 12 further comprising a tapered notch of the collar opened toward the bottom and extending circumferentially about the rotary member for communication with the vent aperture as the rotary member is rotated.

14. The rotary-type carburetor set forth in claim 12 further comprising:
a mounting face of the carburetor body engaged to a cylinder head of the four-stroke engine;
the mixing passage communicating through the mounting face for direct communication with an intake channel of the cylinder head; and
the venting passage communicating through the mounting face for direct communication with the sealed cavity.

15. The rotary-type carburetor set forth in claim 12 wherein the vent passage does not utilize a check valve.

16. The rotary-type carburetor set forth in claim 10 wherein the vent passage communicates directly with an upper portion of the sealed cavity generally containing the intake and exhaust valves and defined at least in part by the cylinder head.

17. The rotary-type carburetor set forth in claim 10 wherein the vent passage communicates directly with a lower portion of the sealed cavity generally containing a crankshaft of the mechanical mechanism and defined at least in part by a crankcase.

18. A rotary-type carburetor for a four-stroke combustion engine having a generally sealed cavity housing a mechanical mechanism which operably connects intake and exhaust valves with a reciprocating piston housed slidably by a cylinder defining in part a combustion chamber, the rotary-type carburetor comprising:
   a carburetor body;
   an elongated mixing passage extending through the body;
   a valve chamber communicating with and transverse to the mixing passage and defined at least in part by the carburetor body;
   a rotary member fitted rotatable into the valve chamber;
   a through-bore extending through the rotary member from an upstream end to a downstream end of the through-bore, and constructed and arranged to adjustably generally align with the mixing passage;
   a hole of the rotary member communicating between the valve chamber and the through-bore between the upstream and downstream ends of the through-bore;
   a vent passage communicating between the sealed cavity of the combustion engine and the valve chamber of the carburetor;
   a rotary throttle valve assembly having the rotary member and a needle disposed concentrically to the rotary member and projecting transversely into the through-bore, and being constructed and arranged to move the rotary member and needle axially as the rotary member is rotated; and
   a fuel jet disposed concentrically to the rotary member and projecting from the body toward the needle for fitting of the needle into the fuel jet for control of the quantity of fuel and lubricant entering the through-bore.

19. A rotary valve carburetor for an oil-in-fuel lubricated four-stroke engine having a cylinder, a piston received in the cylinder, a combustion chamber defined at least in part by the piston and cylinder, an intake valve communicating with the combustion chamber, an exhaust valve communicating with the combustion chamber, a crankshaft operably connected with the piston, a mechanical mechanism operably connecting the crankshaft with the intake and exhaust valves, and a generally sealed cavity housing at least the mechanism operably connecting the intake and exhaust valves, the rotary valve carburetor comprising:
   a carburetor body;
   a mixing passage extending through the carburetor body;
   a valve chamber intersecting the mixing passage and defined at least in part by the carburetor body;
   a rotary throttle valve received at least in part in the valve chamber and having a bore extending generally transversely through the rotary throttle valve with generally opposed ends each communicating with the mixing passage as the throttle valve is in and rotated between idle and wide open positions; and
   a vent passage opening into the bore through the throttle valve between its ends to continuously communicate with the bore and the mixing passage and configured to continuously communicate with the sealed cavity of the engine to provide continuous communication of the sealed cavity of the engine with the through-bore of the throttle valve and the mixing passage in all rotary positions of the throttle valve in and between the idle and wide open positions of the throttle valve.

20. The carburetor of claim 19 wherein the sealed cavity does not communicate directly with the intake valve and combustion chamber.

21. The carburetor of claim 19 wherein there is sufficient clearance between the piston and the cylinder for lubricant to pass from the combustion chamber through the clearance and into the sealed cavity.

22. The carburetor of claim 19 which also comprises a mounting face of the carburetor body and wherein the vent passage extends through the mounting face for communication with the sealed cavity, and the mixing passage extends through the mounting face for communication with the intake valve to the combustion chamber of the engine.

23. The carburetor of claim 19 wherein the engine comprises a crankcase communicating with the cylinder and at least in part enclosing the crankshaft and the crankcase is part of the generally sealed cavity and continuously communicates with the part of the generally sealed cavity containing the mechanical mechanism operably connecting the intake and exhaust valves with the crankshaft.

24. The carburetor of claim 19 wherein the vent passage does not have a check valve.

25. The carburetor of claim 19 which also comprises:
   (a) a needle disposed generally concentrically to the rotary throttle valve and projecting generally transversely into the bore through the rotary throttle valve, and the throttle valve and needle being constructed and arranged to move generally axially as the throttle valve is rotated between its idle and wide open positions; and
   (b) a fuel jet with an orifice opening to the bore of the throttle valve and slidably receiving the needle for control of the quantity of fuel and lubricant entering the bore of the throttle valve.

26. The carburetor of claim 19 wherein the vent passage includes an aperture opening into the valve chamber and a tapered notch in the rotary valve continuously communicating with the aperture as the rotary valve is in and rotated between its idle and wide open positions.

* * * * *